United States Patent
Cheng et al.

(10) Patent No.: US 8,457,147 B2
(45) Date of Patent: Jun. 4, 2013

(54) CABLE MODEM AND CONNECTION RETAINING METHOD

(75) Inventors: Chi-Wen Cheng, Taipei Hsien (TW); Chun-Chieh Yang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 727 days.

(21) Appl. No.: 12/728,254

(22) Filed: Mar. 21, 2010

(65) Prior Publication Data

US 2010/0303137 A1 Dec. 2, 2010

(30) Foreign Application Priority Data

May 27, 2009 (CN) .......................... 2009 1 0302696

(51) Int. Cl.
*H04J 3/16* (2006.01)
*H04B 1/38* (2006.01)

(52) U.S. Cl.
USPC ............ 370/437; 370/465; 370/466; 375/222

(58) Field of Classification Search
USPC ................... 370/437, 465, 466, 467; 375/222
See application file for complete search history.

(56) References Cited

U.S. PATENT DOCUMENTS

| | | | |
|---|---|---|---|
| 7,058,007 B1 | 6/2006 | Daruwalla et al. | |
| 2004/0047364 A1* | 3/2004 | Briggs et al. | 370/463 |
| 2004/0181811 A1* | 9/2004 | Rakib | 725/122 |
| 2004/0190544 A1* | 9/2004 | Azenko et al. | 370/442 |
| 2004/0244043 A1* | 12/2004 | Lind et al. | 725/111 |
| 2005/0175040 A1* | 8/2005 | Holborow | 370/509 |
| 2005/0235333 A1* | 10/2005 | Bertonis et al. | 725/111 |
| 2005/0265338 A1* | 12/2005 | Chapman et al. | 370/389 |
| 2008/0089399 A1* | 4/2008 | Azenko et al. | 375/222 |
| 2008/0209489 A1* | 8/2008 | Joyce et al. | 725/111 |
| 2009/0125959 A1* | 5/2009 | Oh et al. | 725/111 |
| 2009/0310480 A1* | 12/2009 | Bao et al. | 370/217 |
| 2012/0300859 A1* | 11/2012 | Chapman et al. | 375/257 |

* cited by examiner

*Primary Examiner* — Andrew Lee
(74) *Attorney, Agent, or Firm* — Altis Law Group, Inc.

(57) ABSTRACT

A cable modem in communication with a cable modem termination system (CMTS) scans and tries to lock onto a primary channel, tries to receive a media access control domain description (MDD) message includes subsidiary channels from the CMTS if the primary channel is locked, and tries to lock onto the subsidiary channels in the received MDD message. The cable modem further retains the cable modem to work with the DOCSIS 3.0 standard upon the condition that the primary channel and the subsidiary channels are all locked or retains the cable modem to work with the DOCSIS 2.0 standard upon the condition that the MDD message is not received or the subsidiary channels are not successfully locked.

14 Claims, 5 Drawing Sheets

ID: 8,457,147 B2

CABLE MODEM AND CONNECTION RETAINING METHOD

BACKGROUND

1. Technical Field

Embodiments of the present disclosure relate to modems, and more particularly to a cable modem and connection retaining method.

2. Description of Related Art

Nowadays, most communication terminals, such as personal computers, access the Internet using cable modems that are connected to a cable modem termination system (CMTS). CMTS systems typically employ the DOCSIS protocol to provide internet access to the cable modems.

In general, the DOCSIS protocol includes the DOCSIS 2.0 and the DOCSIS 3.0. The DOCSIS 2.0 is a narrowband standard and merely works with one channel. The DOCSIS 3.0 is a wideband standard and works with a primary channel and a plurality of subsidiary channels. Currently, cable modems working with either the DOCSIS 2.0 or the DOCSIS 3.0 disconnect from the CMTS and cannot automatically recover the connection to the CMTS if any of the channels have disconnected. Therefore, a system to resolve this weakness is needed.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
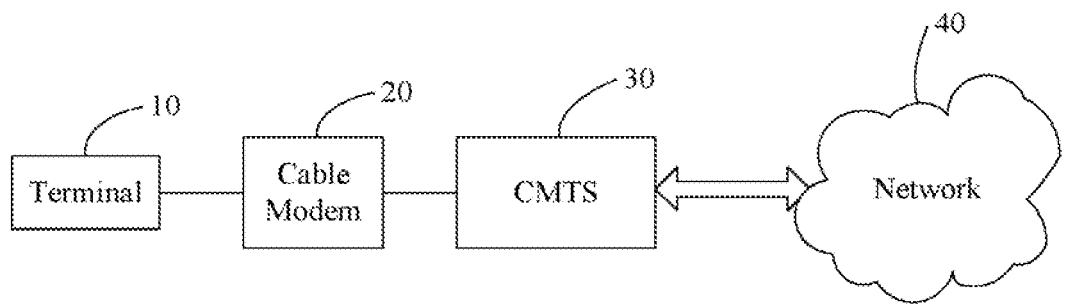
FIG. 1 is a schematic diagram of an application environment of one embodiment of a cable modem of the present disclosure.

FIG. 1 is a schematic diagram of an application environment of one embodiment of a cable modem 20 of the present disclosure. The cable modem 20 connects between a terminal 10 and a cable modem termination system (CMTS) 30 and accesses a network 40 by way of the CMTS 30. In one embodiment, the terminal 10 may be a computer, a notebook, or any other communication terminal device.

Figure 2:
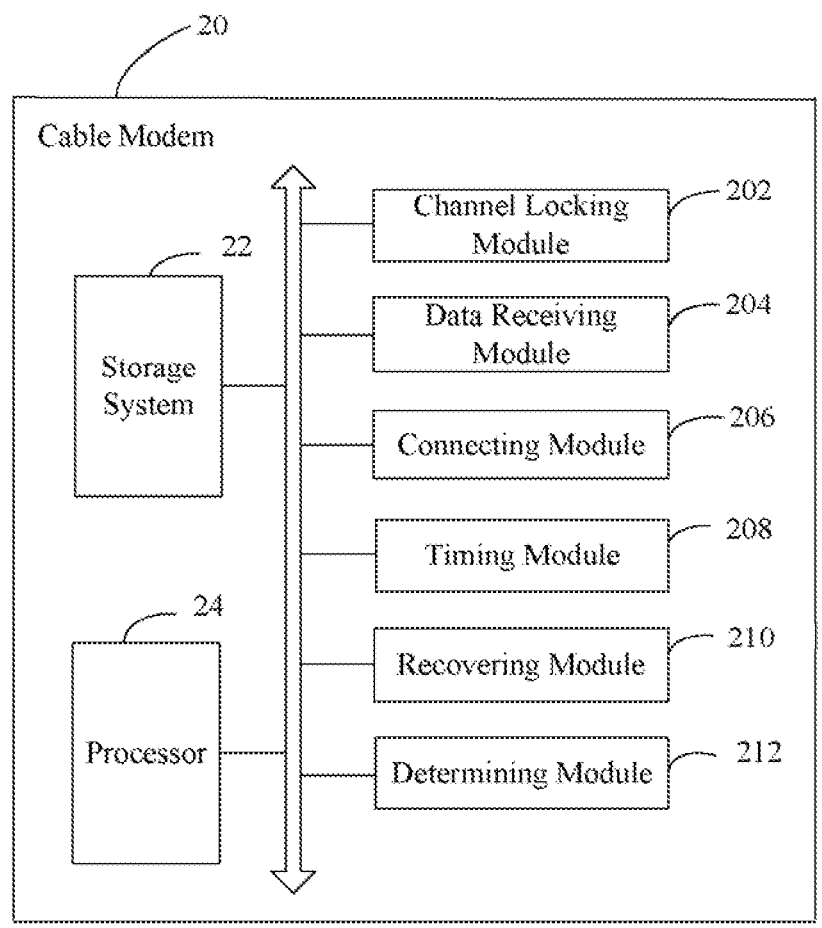
FIG. 2 is a schematic diagram of functional modules of one embodiment of a cable modem of the present disclosure.

FIG. 2 is a schematic diagram of functional modules of one embodiment of the cable modem 20 of the present disclosure. In one embodiment, the cable modem 20 includes a storage system 22, a processor 24, a channel locking module 202, a data receiving module 204, a connecting module 206, a timing module 208, a recovering module 210, and a determining module 212. The modules 202-212 may include one or more computerized instructions stored in the storage system 22 and are executable by the processor 24.

Upon boot up of the cable modem 20, the channel locking module 202 scans all communication channels and tries to lock onto a primary channel of the cable modem 20. It should be understood that locking onto a channel is defined to include finding a channel and employing the channel. In the embodiment, frequency of the primary channel is preset and stored in the storage system by users of the cable modem 20. The CMTS 30 periodically transmits a media access control domain description (MDD) message including subsidiary channels to the cable modem if the primary channel is locked.

The data receiving module 204 tries to receive the MDD message if the primary channel is locked by the channel locking module 202. The channel locking module 202 tries to lock onto the subsidiary channels in the received MDD message. If the primary channel and the subsidiary channels are all successfully locked, the connecting module 206 retains the cable modem 20 to work with the wideband standard, namely the DOCSIS 3.0. If the MDD message is not successfully received by the data receiving module 204 or the subsidiary channels are not successfully locked, the connecting module 206 retains the cable modem 20 to work with the narrowband standard, namely the DOCSIS 2.0.

When the CMTS 30 transmits data to the cable modem 20 by the primary channel or the subsidiary channels, one or more channels of the cable modem 20 may disconnect from the CMTS 30. The timing module 208 starts a first timer if the timing module 208 determines one or more channels have disconnected. The channel locking module 202 continuously tries to lock onto the one or more disconnected channels before the first timer times out. If the one or more disconnected channels are locked, the timing module 208 ends the first timer and the connecting module 206 retains the cable modem 20 to work with the wideband standard, namely the DOCSIS 3.0. If the one or more disconnected channels are not successfully locked when the first timer times out, the channel locking module 202 re-scans and re-locks onto the primary channel.

When the cable modem 20 works with the narrowband standard, namely the DOCSIS 2.0, the recovering module 210 starts a second timer. The data receiving module 204 continuously receives the MDD message from the CMTS 30 before the second timer times out. If the data receiving module 204 receives the MDD message before the second timer times out, the determining module 212 determines if the subsidiary channels exist. If all of the subsidiary channels exist, the channel locking module 202 re-scans and re-locks onto the primary channel. If the data receiving module 204 does not receive the MDD message when the second timer times out, the recovering module 210 restarts the second timer.

Figure 3A:
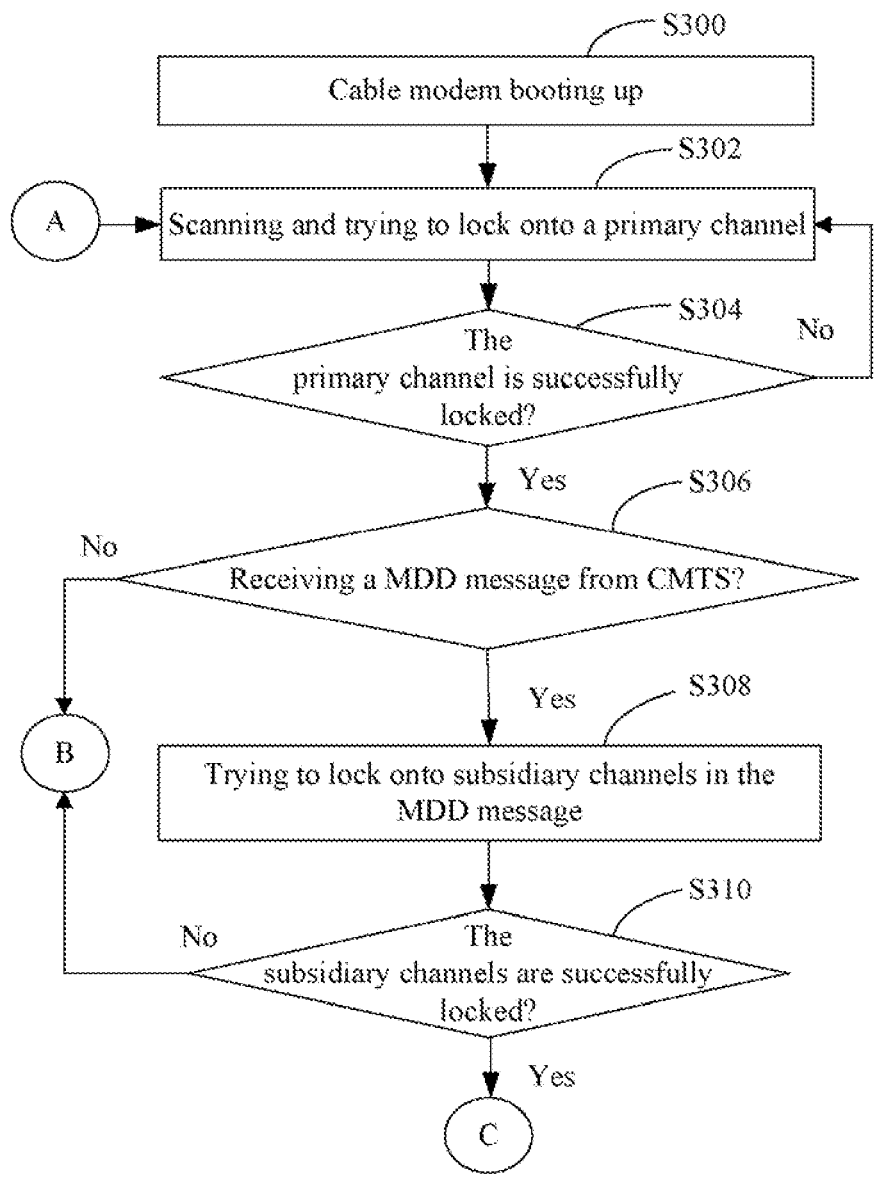
FIG. 3A, FIG. 3B, and FIG. 3C are flowcharts of one embodiment of a connection retaining method of the present disclosure.
Figure 3B:
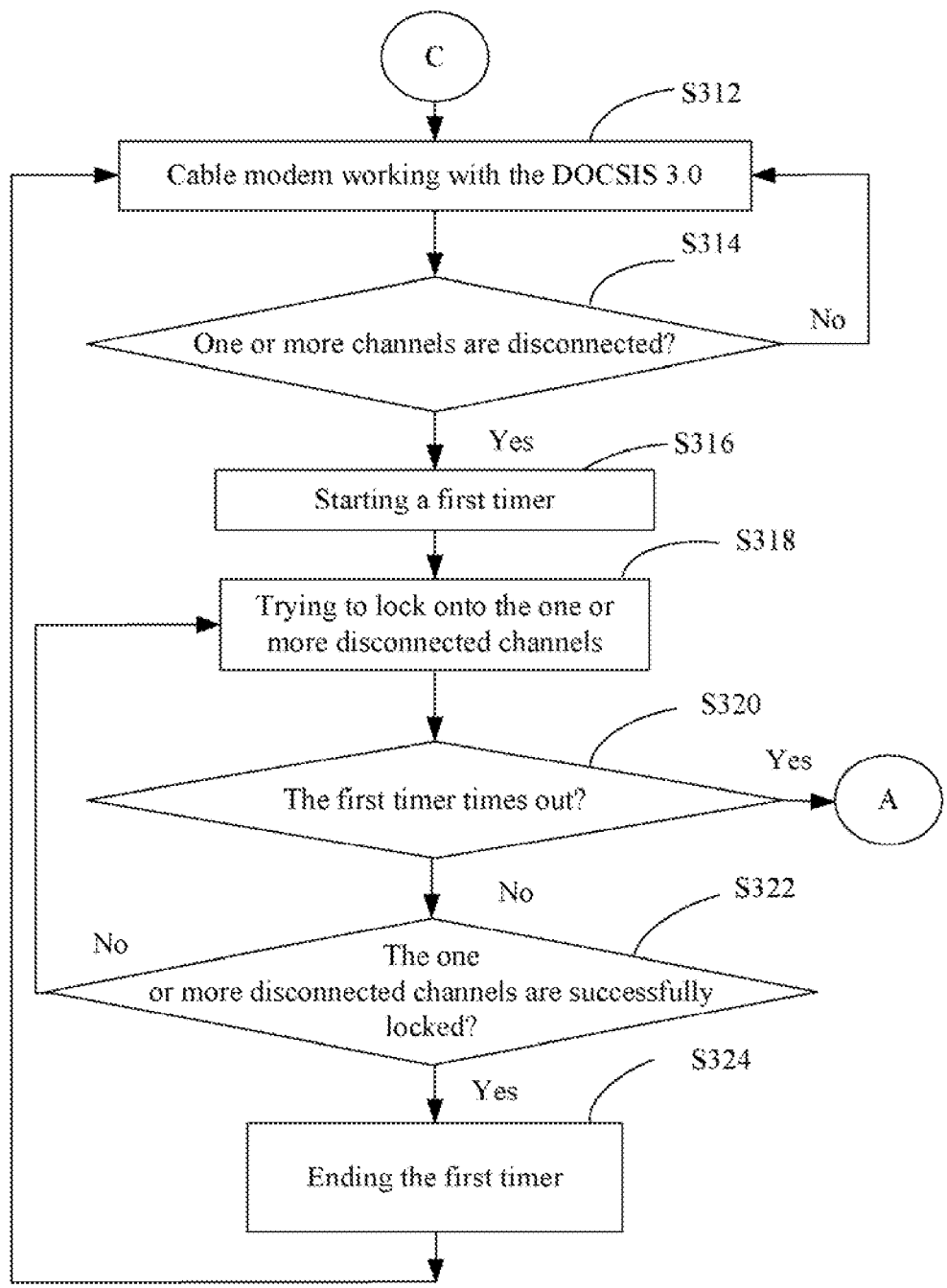
Figure 3C:
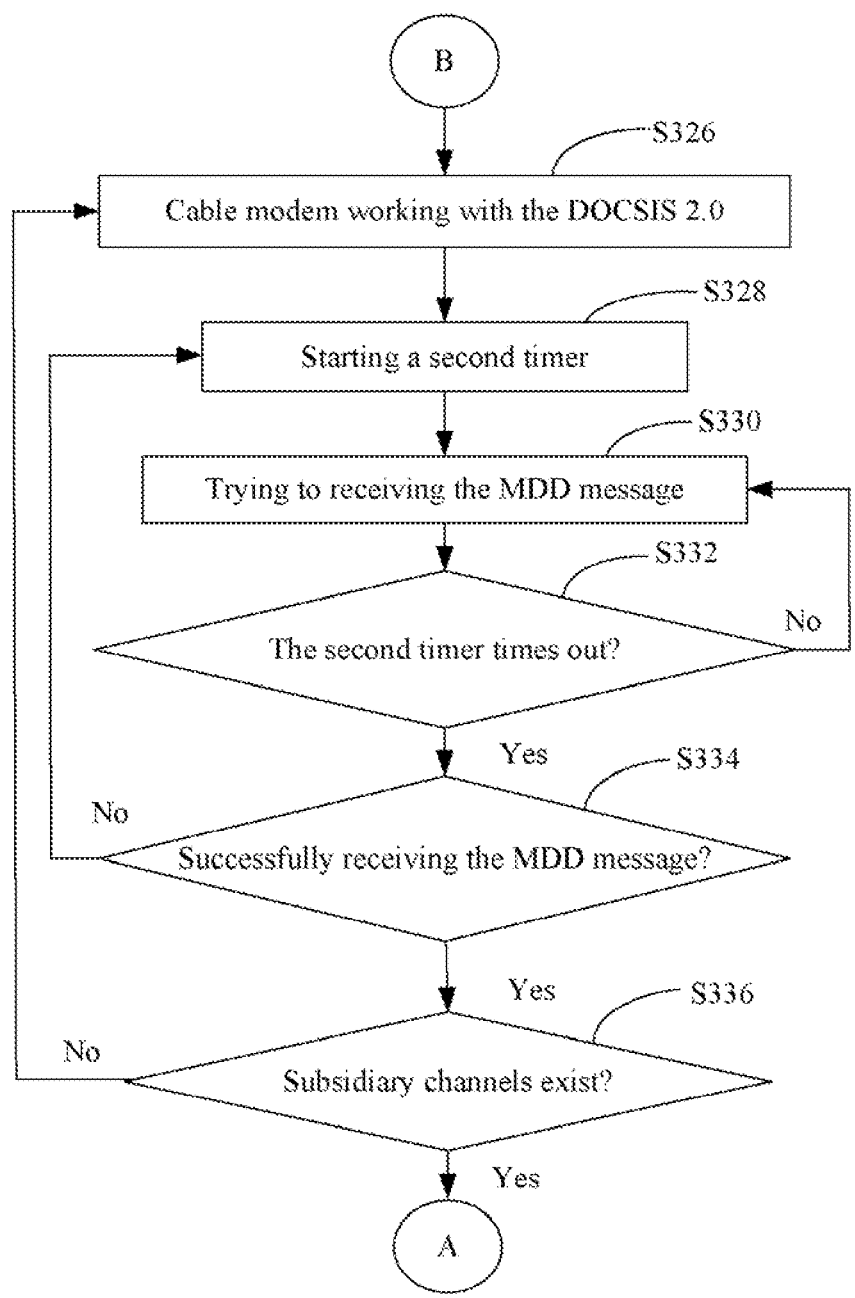

FIG. 3A, FIG. 3B, and FIG. 3C are flowcharts of one embodiment of a connection retaining method of the present disclosure. The method may be embodied in the cable modem 20, and is executable by the functional modules such as those of FIG. 2.

In block S300, the cable modem 20 boots up and then, in block S302, the channel locking module 202 scans and tries to lock onto a preset primary channel of the cable modem 20. In block S304, the data receiving module 204 determines if the primary channel is locked by the channel locking module 202. In detail, the data receiving module 204 receives downstream signals from the CMTS 30 by one channel and determines if the downstream signals include three kinds of signals, namely quadrature amplitude modulation (QAM) signals, forward error correction pattern (FEC pattern) signals, and moving pictures experts group (MPEG) signals. The channel is successfully locked if the downstream signals include the three kinds of signals. The channel is not successfully locked if the downstream signals do not include any of the signals.

If the primary channel is not successfully locked, then in block S302, the channel locking module 202 re-scans and re-locks onto the primary channel. If the primary channel is locked, the CMTS 30 periodically transmits a media access control domain description (MDD) message including subsidiary channels to the cable modem 20, and in block S306, the data receiving module 204 determines if the MDD message is received from the CMTS 30. If the MDD message is received by the data receiving module 204, then in block S308, the channel locking module 202 tries to lock onto the subsidiary channels in the received MDD message. In block S310, the connecting module 206 determines if the subsidiary channels are all locked.

If the subsidiary channels are all locked, then in block S312, the connecting module 206 retains the cable modem 20 to work with the wideband standard, namely the DOCSIS 3.0. When the CMTS 30 transmits data to the cable modem 20 by the primary channel or the subsidiary channels, one of the channels may disconnect from the CMTS 30. In block S314, the timing module 208 periodically detects the primary channel and the subsidiary channels, and determines if one or more channels have disconnected.

If the timing module 208 determines one of the channels have disconnected, then in block S316, the timing module 208 starts a first timer and in block S318, the channel locking module 202 tries to lock onto the disconnected channel before the first timer times out. In block S320, the timing module determines if the first timer times out. If the first timer does not time out, then in block S322, the channel locking module 202 determines if the disconnected channel is locked and in block S324, the timing module 208 ends the first timer if the disconnected channel is locked.

If the disconnected channel is locked, then in block S312, the connecting module 206 retains the cable modem 20 to work with the wideband standard, namely the DOCSIS 3.0. If the disconnected channel can not be locked when the first timer times out, then in block S302, the channel locking module 202 re-scans and re-locks onto the primary channel.

If the MDD message is not received or any subsidiary channel is not successfully locked, then in block S326, the connecting module 206 retains the cable modem 20 to work with the narrowband standard, namely the DOCSIS 2.0. If the cable modem works with the narrowband standard, namely the DOCSIS 2.0, in block S328, the recovering module 210 starts a second timer, and in block S330, the data receiving module 204 tries to receive the MDD message from the CMTS 30.

In block S332, the determining module 212 determines if the second timer times out and in block S330, the data receiving module 204 continuously tries to receive the MDD message from the CMTS 30 before the second timer times out. If the second timer times out, then in block S334, the data receiving module 204 determines if the MDD message is received before the second timer times out. If the data receiving module 204 does not successfully receive the MDD message when the second timer times out, then in block S328, the recovering module 210 restarts the second timer.

If the data receiving module 204 receives the MDD message before the second timer times out, then in block S336, the determining module 212 determines if the subsidiary channels exist. In detail, if the downstream signals can be received from the CMTS 30 by one channel, then the channel exists, or vice versa. If all of the subsidiary channels exist, then in block S302, the channel locking module 202 re-scans and re-locks onto the primary channel. If not all the subsidiary channels exist, then in block S326, the connecting module 206 retains the cable modem 20 to work with the narrowband standard, namely the DOCSIS 2.0.

If the cable modem 20 does not successfully work with the wideband standard, the connection retaining method automatically re-locks onto the disconnected channel or retains the cable modem 20 to work with the narrowband standard. Therefore, the connection retaining method of the present disclosure can retain the connection between the cable modem 20 and the CMTS 30. In addition, the connection retaining method automatically recovers the wideband standard of the cable modem 20 by automatically relocking onto the subsidiary channels.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A cable modem in communication with a cable modem termination system (CMTS), the cable modem comprising a processor, a storage system, and one or more programs, wherein the one or more programs are stored in the storage system and operable to be executed by the processor, the cable modem comprising:

a channel locking module operable to scan and try to lock onto a primary channel of the cable modem;

a data receiving module operable to try to receive a media access control domain description (MDD) message from the CMTS if the primary channel is locked by the channel locking module, wherein the MDD message includes subsidiary channels of the cable modem and the channel locking module is further operable to try to lock onto the subsidiary channels in the received MDD message; and a connecting module operable to retain the cable modem to work with the DOCSIS 3.0 standard upon the condition that the primary channel and the subsidiary channels are all locked, or to retain the cable modem to work with the DOCSIS 2.0 standard upon the condition that the MDD message is not received or the subsidiary channels are not successfully locked.

2. The cable modem as claimed in claim 1, further comprising a timing module operable to start a first timer upon the condition that one or more channels have disconnected, wherein the channel locking module is further operable to continuously try to lock onto the one or more disconnected channels before the first timer times out, the connecting module is further operable to retain the cable modem to work with the DOCSIS 3.0 standard upon the condition that the one or more disconnected channels are locked.

3. The cable modem as claimed in claim 2, wherein the timing module is further operable to end the first timer upon the condition that the one or more disconnected channels are locked.

4. The cable modem as claimed in claim 2, wherein the channel locking module is further operable to re-scan and re-lock onto the primary channel upon the condition that the one or more disconnected channels is not successfully locked when the first timer times out.

5. The cable modem as claimed in claim 1, further comprising:

a recovering module operable to start a second timer upon the condition that the cable modem works with the DOCSIS 2.0 standard, wherein the data receiving module is further operable to continuously receive the MDD message from the CMTS before the second timer times out; and a determining module operable to determine if the subsidiary channels exist upon the condition that the data receiving module receives the MDD message before the second timer times out, wherein the channel locking module is further operable to re-scan and re-lock onto the primary channel upon the condition that all of the subsidiary channels exist.

6. The cable modem as claimed in claim 5, wherein the recovering module is further operable to restart the second timer upon the condition the data receiving module does not successfully receive the MDD message when the second timer times out.

7. The cable modem as claimed in claim 5, wherein the connecting module is further operable to retain the cable modem to work with the DOCSIS 2.0 standard upon the condition that not all the subsidiary channels exist.

8. A connection retaining method of a cable modem in communication with a cable modem termination system (CMTS), comprising:

scanning and trying to lock onto a preset primary channel of the cable modem;
determining if the primary channel is locked;
determining if a MDD message comprising subsidiary channels of the cable modem is received from the CMTS if the primary channel is locked;
trying to lock onto the subsidiary channels in the received MDD message if the MDD message is received;
determining if the subsidiary channels are all locked;
retaining the cable modem to work with the DOCSIS 3.0 standard if the subsidiary channels are all locked; or
retaining the cable modem to work with the DOCSIS 2.0 standard if the MDD message is not received or any subsidiary channel is not successfully locked.

9. The connection retaining method as claimed in claim 8, further comprising when the cable modem works with the DOCSIS 3.0 standard:

periodically detecting the primary channel and the subsidiary channels and determining if one or more channels have disconnected;
starting a first timer if one or more channels have disconnected;
trying to lock onto the disconnected channel;
determining if the first timer times out;
determining if the disconnected channel is locked if the first timer does not time out; and
ending the first timer and retaining the cable modem to work with the DOCSIS 3.0 standard if the disconnected channel is locked.

10. The connection retaining method as claimed in claim 9, further comprising re-scanning and re-locking onto the primary channel if the disconnected channel can not be locked when the first timer times out.

11. The connection retaining method as claimed in claim 9, further comprising continuously trying to lock onto the disconnected channel if the disconnected channel is not locked and the first timer does not time out.

12. The connection retaining method as claimed in claim 8, further comprising when the cable modem works with the DOCSIS 2.0 standard:

starting a second timer;
trying to receive the MDD message from the CMTS;
determining if the second timer times out;
determining if the MDD message is received if the second timer times out;
determining if the subsidiary channels exist if the MDD message is received; and
re-scanning and re-locking onto the primary channel if all of the subsidiary channels exist.

13. The connection retaining method as claimed in claim 12, further comprising continuously receiving the MDD message if the second timer does not time out.

14. The connection retaining method as claimed in claim 12, further comprising restarting the second timer if the MDD message is not received and the second timer times out.

* * * * *